Aug. 14, 1956

K. RABE 2,758,686

HYDRAULIC CLUTCH-ACTUATING MECHANISM MORE
PARTICULARLY FOR MOTOR VEHICLES

Filed Nov. 10, 1954

INVENTOR
Karl Rabe

By
Pennie, Edmonds, Morton, Barrows & Taylor
Attorneys

Aug. 14, 1956     K. RABE     2,758,686
HYDRAULIC CLUTCH-ACTUATING MECHANISM MORE
PARTICULARLY FOR MOTOR VEHICLES

Filed Nov. 10, 1954     2 Sheets-Sheet 2

INVENTOR
Karl Rabe
By
Pennie, Edmonds, Morton, Barrows & Taylor
Attorneys

United States Patent Office 2,758,686
Patented Aug. 14, 1956

2,758,686

HYDRAULIC CLUTCH-ACTUATING MECHANISM MORE PARTICULARLY FOR MOTOR VEHICLES

Karl Rabe, Korntal, Germany, assignor to Dr. Ing. h. c. F. Porsche K.-G., Stuttgart-Zuffenhausen, Germany Application November 10, 1954, Serial No. 468,113

Claims priority, application Germany November 13, 1953

8 Claims. (Cl. 192—3.5)

This invention relates to improvements in hydraulic clutch-actuating mechanisms, particularly for motor vehicles.

Devices are known for effecting the engagement and disengagement of the clutch of a motor vehicle by the speed of rotation of the motor. These known arrangements include two fluid pumps driven from the motor and a number of oppositely controlling sliders operated by the fluid pressure of the fluid medium supplied by the pump in dependence on the speed of rotation of the motor and also on the atmospheric pressure. In these constructions, the clutch is actuated by means of a second fluid medium, the flow and action of which are controlled by the sliders actuated by the first fluid medium. This arrangement is unnecessarily complex and because of the numerous slider controls and control channels and ducts is expensive to manufacture. Furthermore, since declutching occurs only at the idling speed of the motor, and there is no means for disengaging the clutch for changing gears, this arrangement cannot be readily adapted for use in a motor vehicle, or generally adopted for such use.

It has also been proposed to combine a gear change lever with a clutch pedal in such a way that the gear change lever holds the clutch out positively during gear changing. However, this arrangement facilitates only the process of changing gears, and there is a reverse engagement of the clutch which leads to excessive stresses on individual parts of the vehicle such as the transmission, and in particular, the clutch itself. These effects are noticed by the vehicle passengers and give them an unpleasant feeling. According to this proposal, the clutch must also be operated by the driver for starting and stopping.

The primary object of the invention is to provide a hydraulic clutch-actuating mechanism which overcomes the faults and disadvantages of known prior devices and provides a perfectly smooth operation.

A further object of the invention is to provide a hydraulic clutch-actuating mechanism which consists of relatively few constructional parts and which is relatively inexpensive to manufacture.

Another object of the invention is to provide a hydraulic clutch-actuating mechanism in which declutching is effected indirectly by the gear lever when changing gears and after the gears have been changed engages the clutch again smoothly.

A still further object of the invention is to provide a hydraulic clutch-actuating mechanism in which the clutch is automatically disengaged during the stopping of the vehicle so that there is no stalling of the engine.

According to the invention, the improved mechanism includes means by which the engagement and disengagement of the clutch is controlled directly by the pressure of hydraulic fluid or oil supplied by a pump driven by the engine, and an auxiliary control device or arrangement connected by a rod with the gear lever. In this system means is provided, which on actuation of the gear lever, suppresses the flow of hydraulic oil for the engagement of the clutch, so that the clutch is disengaged.

In order to simplify the construction of the actuating mechanism, the flow of hydraulic fluid to and from the pressure chamber of the clutching and declutching device for the clutch is controlled by means of an automatically actuated pressure responsive slide valve.

The auxiliary control device, according to the invention, comprises a flow control slider or slide valve means connected with the gear lever by means of a rod. The slider is biased from opposite sides by a sprung flexible member so that it, together with the gear lever, swings back into its normal position after a gear change.

The invention includes other features, objects and advantages described more in detail hereinafter in connection with the accompanying drawings which show one constructional form of the invention by way of example.

Figure 1:
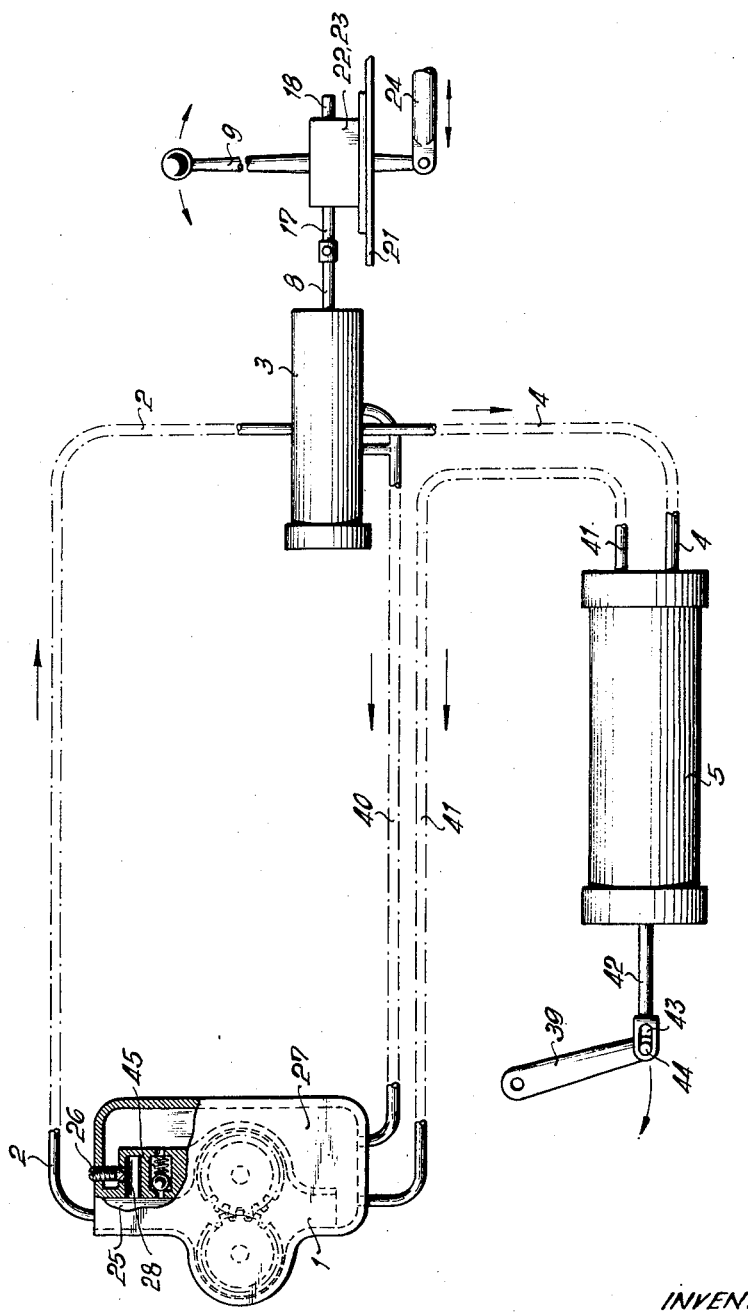
Fig. 1 is a diagrammatic view of a hydraulic actuating mechanism and system constructed according to the invention and in which certain of the elements are shown in elevation with parts broken away.

Referring to Fig. 1 of the drawings, the improved mechanism includes a hydraulic pump 1 driven, for example, by the internal combustion engine of the motor vehicle (not shown). A pipe 2 for hydraulic fluid leads from the output side of the pump 1 to an auxiliary control device 3, which is connected by means of a pipe 4 with a clutching and declutching device 5, for the usual or conventional mechanical clutch (not shown), having an operating lever 39.

Figure 3:
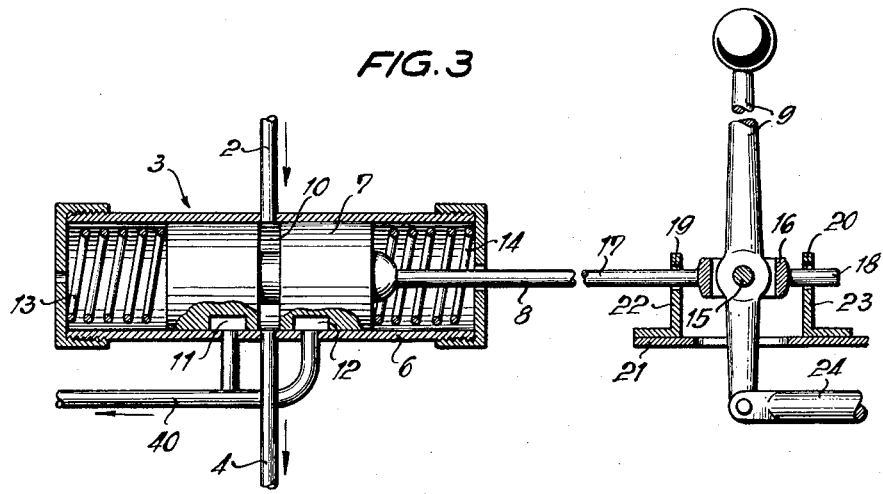
Fig. 3 is a longitudinal sectional view on an enlarged scale through the auxiliary control device and gear lever arrangement shown in Fig. 1.

The auxiliary control device 3 shown more in detail in Fig. 3 is comprised of a cylinder 6 in which is slidably mounted a control piston 7 connected by a piston rod 8 with a gear shift lever 9. The control piston 7 is provided at its center with a ring groove 10 and with recesses or ports 11 and 12, respectively, on opposite sides of the peripheral groove 10. Compression springs 13 and 14 are respectively mounted in the cylinder 6 at the opposite ends of the control piston 7 for holding the piston in a balanced normal position in which the ring groove 10 is in register with the ends of the pipes 2 and 4 shown connected into the cylinder 6 opposite each other. In the position, as shown in Fig. 3, the piston 7 allows an unhindered flow of the hydraulic fluid from the pipe 2 to the pipe 4. One end of the cylinder 6 is vented around the piston rod 8, while the other one is provided with a vent opening, as shown, so that there is no build up of air pressure in either end of the cylinder 6 when the piston 7 is actuated.

The gear shift lever 9 associated with the control 3 is remote from the gear box and is mounted on a pin 15 for tilting movement in a ring 16. The ring 16 is provided with two opposite pins 17 and 18 which are retained and guided in bores 19 and 20, respectively, in brackets 22 and 23 attached to a support 21. The pin or rod 17 is connected by a link joint with the rod 8 of the auxiliary control device 3 as shown in Fig. 1. The movement of the gear shift lever 9 is transmitted to the gear box (not shown) by means of a gear shift rod 24 pivoted to its lower end.

The gear pump 1 shown in Fig. 1 includes a pressure chamber 25 and a suction chamber 27. When the vehicle is stopped and the engine or motor is running at its minimum idling speed the amount of oil supplied by the gear pump 1 is very small and is able to flow from the pressure chamber 25 through an opening 28 directly into the suction chamber 27 so that no effort is exerted on the control equipment. The rate of flow through the opening 28 is regulated by means of a screw 26 in the pump housing directly over the opening 28. The pump 1 is also provided with an excess pressure valve 45 which prevents a selected maximum pressure being exceeded in the pressure chamber 25, the valve 45 being located in a bypass between the pressure chamber 25 and the suction chamber 27.

Figure 2:
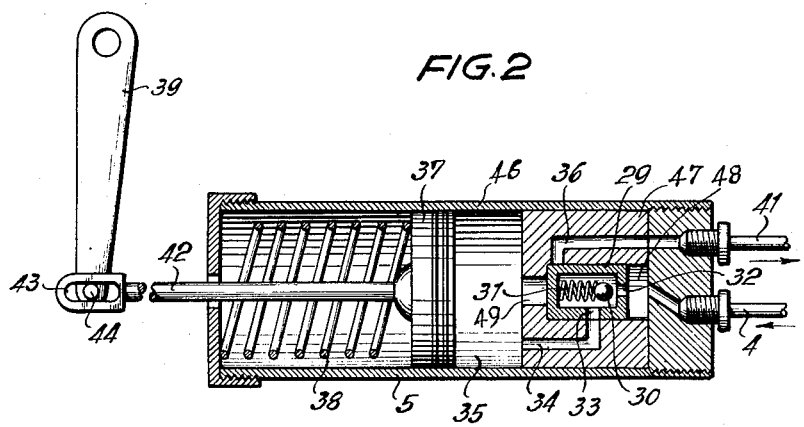
Fig. 2 is a longitudinal sectional view on an enlarged scale through the clutching and declutching device shown in Fig. 1, for a mechanical clutch, with the parts shown in the position of clutch engagement.

The clutching and declutching device 5, as shown in Fig. 2, includes a cylinder 46, in one end of which is mounted a valve body 47 having an axial cylindrical bore 48 housing a hollow control cylinder 29 provided with an inlet port 32 at one end and a side outlet port 33, the port 32 being controlled by a ball valve 30 biased by a spring 31. The pipe 4 is connected into the end of the cylinder 46 and opens through a duct, as shown, into the cylindrical bore 48 opposite the port 32 in the end of the control cylinder 29. The port 33 is adapted to register with a duct 34 communicating with a pressure chamber 35 in the cylinder 46. Hydraulic fluid or oil is removed or vented from the pressure chamber 35 through a duct 36 connected with a return pipe 41. The duct 36 is ported into the periphery of the cylindrical bore 48 so that it may be opened and closed by the control cylinder 29. When the cylinder 29 is to the right in Fig. 2, the duct 36 is opened into the cylinder 48 which is connected with the pressure chamber 35 by a cylindrical bore 49 of smaller diameter than the control cylinder 29.

The cylinder 46 of the clutching and declutching device 5 houses a piston 37 biased toward the chamber 35 by a compression spring 38. The piston 37 is connected by a piston rod 42, extending through a vent opening in the end of the cylinder 46, with the movable end of a clutch operating lever 39. In order that the variation of the pressure of the hydraulic oil in the system with every change in speed of the engine shall not affect the clutch, the projecting end of the piston rod 42 is provided with a slot 43 in which a pin 44 at the end of the clutch lever 39 is slidable.

In the operation of the hydraulic clutch-actuating mechanism, the hydraulic fluid delivered by the pump 1 when the vehicle engine is idling at minimum speed flows through the bypass port 28. If the speed of the engine, and that of the gear pump 1, is increased then the oil pressure in the pressure chamber 25 of the oil pump increases and this pressure is propagated through the pipe 2 to the auxiliary control device 3. Since, because of the action of the springs 13 and 14 on the control piston 7 of the device 5, the control piston is in its normal position, the oil pressure from the pump 1 is propagated through the groove 10 and the pipe 4 to the clutching and declutching device 5 for the clutch. As the pressure of the hydraulic fluid builds up in the cylindrical bore 48, the control cylinder 29 (Fig. 2) is pressed back in the bore 48 to close the port 49. The oil pressure overcomes the spring 31 to unseat the ball valve 30 so that the hydraulic fluid can pass through the ports 32 and 33 and the duct 34 into the pressure chamber 35. Since the outflow of oil through port 49 and the duct 36 is prevented by the control cylinder 29 (the cross-sectional area of the bore 48 being greater than that of the bore 49), the piston 37 is moved to the left in Fig. 2 as the pressure of the spring 38 is overcome, thereby actuating the clutch lever 39 to operate the clutch in a known manner to effect, or permit, its engagement. Fig. 2 shows the condition of the device 5 with the clutch engaged.

If the gears are to be changed, the gear-change lever 9 guided by the rods 17 and 18 is moved so that the ring 16 comes up against one of the stops 22 or 23 according to the direction of movement required for the gear change. At the same time the piston 7 of the auxiliary control device 3 is moved by means of the piston rod 8 so that the pipe 2 is closed. The shifting of the piston 7 on the other hand at the same time makes connection, for example, through the cut-out or port 11 between the pressure pipe 4 and a return flow pipe 40, connected into the suction chamber 27 of the pump and provided with two branches shown in register respectively with the ports 11 and 12 in Fig. 3.

When the lever 9 is swung to the right in Fig. 3, the port or duct 11 in the piston 7 overlaps the inlet to the left branch of the pipe 40 and the inlet of the pipe 4. In this position of the piston 7, the hydraulic oil under pressure in the pipe 4 and in the clutching and declutching device 5 is relieved of pressure. When the pressure is relieved in the line 4, through the line 40, the ball valve 30 of the device 5 closes under the influence of the spring 31 and the control cylinder 29 is moved to the right or in the direction of pipe 4 by the excess pressure prevailing in the pressure chamber 35. This movement of the cylinder 29 opens the duct 36, via port 49, to the pressure chamber 35, and the piston 37, and with the aid of the spring 38 forces the oil in the pressure chamber 35 through the pipe 41 into the suction chamber 27 of the oil pump 1. As the lever 9 is swung to the right, in the manner described, for example, and the ring 16 engages stop 23, the gear change rod is shifted to the left in Fig. 3. Thus, the clutch is simultaneously disengaged so that the gear change can be made by means of the gear lever 9. Subsequently the control piston 7, together with the gear lever 9 is brought into its normal position by the springs 13 and 14, thereby restoring the connection between the pump 1 and the device 5, so that the oil pressure supplied by the pump is brought into action and the clutch re-engaged, in the manner described above.

When stopping the vehicle, the engine is throttled by the reduction in speed of the vehicle so that the oil pressure provided by the pump steadily drops. When this becomes less than the pressure of the spring 38 in the clutch-operating device 5, then the clutch gradually disengages and stalling of the engine cannot occur.

What I claim is:

1. A hydraulic actuating mechanism for a mechanical clutch, particularly for engine-driven motor vehicles, comprising a pump driven by the engine for supplying hydraulic fluid under pressure, a device for operating the clutch, means for delivering the hydraulic fluid under pressure from the pump to said device for operating the clutch, a gear-shift lever, an auxiliary control device connected with and operable by the gear-shift lever, said auxiliary control device including means for cutting off the flow of hydraulic fluid from the pump to the clutch-operating device on actuation of the gear-change lever, and means responsive to the operation of the auxiliary control device for bringing about disengagement of the clutch.

2. A mechanism as claimed in claim 1, in which the device for operating the clutch includes means responsive to the pressure of the hydraulic fluid supplied thereto for controlling the flow of the hydraulic fluid to and from the clutch-operating device.

3. A mechanism as claimed in claim 2, in which the pressure-responsive means comprises an automatically-acting slide valve.

4. A mechanism as claimed in claim 1, in which the auxiliary control device includes a slide valve means connected to the gear-shift lever for controlling the flow of hydraulic fluid, and means for biasing said slide valve means to a normal position permitting flow, whereby the slide valve means is moved back to normal position after a gear change.

5. A hydraulic system for actuating a mechanical clutch, particularly for engine-driven motor vehicles, comprising means for supplying hydraulic fluid under pressure, a hydraulically-actuatable means for operating the clutch, a conduit for delivering fluid under pressure from the supply means to the clutch-operating means, a gear-shift means, and means operable by the gear-shift means for controlling the flow of fluid in said conduit and adapted to cut-off the flow to the clutch-operating means and to bring about the release of fluid from the clutch-operating means when the gear-shift means is actuated.

6. A system as claimed in claim 5, in which the fluid-supply means includes a pump, suction and pressure chambers associated with said pump, said clutch-operating means including a pressure chamber connected through said conduit and flow-controlling means to the pressure chamber associated with the pump, a conduit for conducting fluid from the pressure chamber of the clutch-operating means to said suction chamber, and means responsive to a drop in pressure in the pressure chamber associated with the pump to a predetermined point for relieving the pressure in the pressure chamber of the clutch-operating means for direct flow of fluid therefrom through the conduit connected into the suction chamber.

7. A hydraulic system for actuating a mechanical clutch, particularly for engine-driven motor vehicles, comprising means for supplying hydraulic fluid under pressure, a hydraulically-actuatable means for actuating the clutch, a gear-shifting means, a fluid flow-control means operatively connected with the gear shifting means, a conduit for delivering hydraulic fluid under pressure from the fluid supply means to the fluid flow-control means, a second conduit for delivering hydraulic fluid under pressure from the fluid flow-control means to the clutch operating means, said fluid flow-control means including means for permitting the flow of hydraulic fluid under pressure from the first-mentioned conduit into the second conduit and to the clutch operating means, said fluid flow-control means also including means responsive to the actuation of the gear shifting means for cutting off the flow of hydraulic fluid to the second conduit and for relieving the pressure on the hydraulic fluid therein, and means responsive to the release of pressure in said second conduit for releasing hydraulic fluid from the clutch operating means.

8. A hydraulic system as claimed in claim 7, including a third conduit for the flow of released hydraulic fluid from the clutch operating means, said means responsive to the release of pressure in the second conduit including a valve means for said third conduit movable to closed position by hydraulic fluid under pressure in the second conduit and movable to open position by the hydraulic fluid under pressure in the clutch operating means when the pressure is released on the hydraulic fluid in the second conduit.

References Cited in the file of this patent
UNITED STATES PATENTS

| | | |
|---|---|---|
| 1,805,120 | Von Erhardt | May 12, 1931 |
| 2,073,692 | Griswold | Mar. 16, 1937 |
| 2,087,643 | Gillett | July 20, 1937 |
| 2,104,061 | Surdy | Jan. 4, 1938 |